US006583750B2

(12) United States Patent
Shin

(10) Patent No.: US 6,583,750 B2
(45) Date of Patent: Jun. 24, 2003

(54) WIDE-BAND RADAR DETECTOR HAVING ELECTRONIC COMPASS

(75) Inventor: Jin Woo Shin, Seoul (KR)

(73) Assignee: BG Tech Co., Ltd (KR)

( * ) Notice: Subject to any disclaimer, the term of this patent is extended or adjusted under 35 U.S.C. 154(b) by 0 days.

(21) Appl. No.: 10/082,242

(22) Filed: Feb. 26, 2002

(65) Prior Publication Data

US 2003/0038743 A1 Feb. 27, 2003

(30) Foreign Application Priority Data

Aug. 22, 2001 (KR) .................................... 2001-0050797

(51) Int. Cl.[7] ............................................... G01S 7/285
(52) U.S. Cl. ............................ 342/20; 342/54; 342/56; 342/70
(58) Field of Search ............................ 342/20, 25, 70–72, 342/54, 56

(56) References Cited

U.S. PATENT DOCUMENTS

| 4,428,053 A | * | 1/1984 | Tol | .......................... 701/224 |
| 4,513,378 A | * | 4/1985 | Antkowiak | .................. 701/217 |
| 6,275,180 B1 | * | 8/2001 | Dean et al. | .................... 342/70 |
| 6,282,803 B1 | * | 9/2001 | Dunne | ......................... 33/361 |
| 6,297,732 B2 | * | 10/2001 | Hsu et al. | ................... 340/439 |
| 6,304,195 B1 | * | 10/2001 | Bruno | ......................... 340/988 |
| 6,360,615 B1 | * | 3/2002 | Smela | ................... 73/862.474 |
| 6,429,812 B1 | * | 8/2002 | Hoffberg | ................. 342/357.1 |

* cited by examiner

Primary Examiner—Thomas H. Tarcza
Assistant Examiner—Isam Alsomiri
(74) Attorney, Agent, or Firm—Finnegan, Henderson, Farabow, Garrett & Dunner, L.L.P.

(57) ABSTRACT

The present invention relates to a wide-band radar detector with an electronic compass integrated therein. The radar detecting unit includes a horn antenna, a signal processing unit for detecting signals received by the horn antenna, a laser module for receiving laser signals, a central processing unit for controlling the detection of the signals, a visual display means for visually displaying the detected signals, and a voice producing means for outputting the detected signals to a speaker. The electronic compass includes a magneto-inductive sensor for sensing the earth's magnetic field and a sensor controlling unit. The sensor controlling unit then transmits the values sensed by the magneto-inductive sensor to the central processing unit.

7 Claims, 7 Drawing Sheets forward bias reverse bias

WIDE-BAND RADAR DETECTOR HAVING ELECTRONIC COMPASS

FIELD OF THE INVENTION

The present invention relates to a wide-band radar detector, and more particularly, to a wide-band radar detector with an integrated electronic compass.

BACKGROUND OF THE INVENTION

In advanced nations and other countries, efforts to support the safe driving of a vehicle have been made by employing various kinds of speed measuring devices using a microwave or laser, a safety warning transmitter for informing various situations of a road, and the like. In particular, the United States of America approves the use of such speed measuring devices and signal detectors, and the use of such devices for helping the safe driving of a vehicle.

An example of such a device is disclosed in Korean Patent No. 0299325 entitled "Wide Band Radar Detector and Method of Controlling the Same," which was filed by and issued to the same applicant as this application. The wide-band radar detector of the patent uses a circuit and algorithm to prevent malfunction, an oscillator cavity capable of sweeping a wide range of frequencies, a plurality of local oscillators which oscillate at independent respective frequencies, a laser receiving module integrated into a horn antenna, and visual and audible alerts.

FIG. 1 is a block diagram showing a conventional wide-band radar detector. The conventional wide-band radar detector comprises a horn antenna 10, a signal processing unit 20 for detecting signals received by the horn antenna 10, a laser module 30 for receiving laser signals, a central processing unit 40 for controlling the detection of the signals by both the signal processing unit 20 and the laser module 30, a visual display unit 50 for visually displaying the detected signals, and a voice producing means 60 for converting the detected signals into voices through a voice amplifying unit 61. The conventional wide-band radar detector receives signals falling within 8 bands including Ko, X, VG2, Ku, K, SA, SWS, and SUPERWIDE Ka and then outputs the received signals in accordance with a driver's situation to assist in safely driving a vehicle.

Meanwhile, when a driving a vehicle, it is very important for the driver to know the moving direction of the vehicle especially when the driver is traveling in unfamiliar regions. Using a magnetic compass is a known way to determine the moving direction of a vehicle. However, since a magnetic compass uses a general permanent magnet, the compass may operate in an unstable fashion and can be easily influenced by vibration or the like. Therefore, conventional magnetic compasses cannot substantially assist the driver.

Recently, electronic compasses that use a magnetic sensor are being utilized more and more in Europe and America. These electronic compasses can operate with more stability than a conventional magnetic compass and indicate a compass direction through various displays. However, the aforementioned conventional radar detector and electronic compass are separately manufactured and installed in the vehicle. Therefore, it is inconvenient for the driver to operate them separately. In addition, the conventional radar detector and electronic compass require additional installation work, such as for the wiring and power distributors, since they require separate power supplies.

SUMMARY OF THE INVENTION

The present invention is contemplated for solving these and other problems. A wide-band radar detector with an electronic compass integrated is provided. The wide-band radar detector can be easily installed in a vehicle, allow a driver to avoid a traffic accident, induce the safe driving of the vehicle, and improve the driver's convenience by allowing the driver to correctly judge a traffic situation and simultaneously determine a moving direction of the vehicle.

According to an aspect of the present invention, there is provided a wide-band radar detector with an electronic compass integrated therein, comprising a radar detecting unit including a horn antenna, a signal processing unit for detecting signals received by the horn antenna, a laser module for receiving laser signals, a central processing unit for controlling the detection of the signals by both the signal processing unit and the laser module, a visual display means for visually displaying the detected signals, and a voice producing means for outputting the detected signals to a speaker through a voice amplifying unit; and an electronic compass including a magneto-inductive sensor for sensing earth's magnetic field, and a sensor controlling unit for controlling the magneto-inductive sensor by applying a bias voltage to the magneto-inductive sensor and for transmitting the values sensed by the magneto-inductive sensor to the central processing unit.

According to another aspect of the present invention, there is provided a wide-band radar detector with an electronic compass integrated therein, comprising a radar detecting unit including a horn antenna, a signal processing unit for detecting signals received by the horn antenna, a laser module for receiving laser signals, a central processing unit for controlling the detection of the signals by both the signal processing unit and the laser module, a visual display means for visually displaying the detected signals, and a voice producing means for outputting the detected signals to a speaker through a voice amplifying unit; and an electronic compass including a magneto-resistive sensor for sensing earth's magnetic field, an amplifier for amplifying signals outputted from the magneto-resistive sensor, and an A/D converter for converting the signals amplified by the amplifier into digital signals and for transmitting them to the central processing unit.

BRIEF DESCRIPTION OF THE DRAWINGS

The above and other objects and features of the present invention will become apparent from the following description of the embodiments given in conjunction with the accompanying drawings, in which.

DESCRIPTION OF THE EMBODIMENTS

Hereinafter, embodiments of the present invention will be described in detail with reference to the accompanying drawings.

Figure 1:
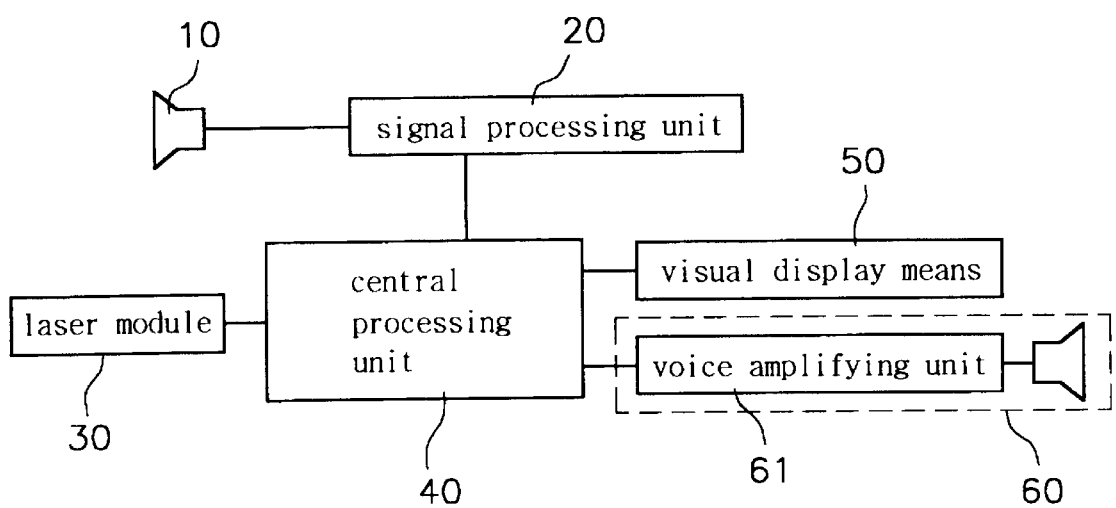
FIG. 1 is a block diagram showing a conventional wide-band radar detector.
Figure 2:
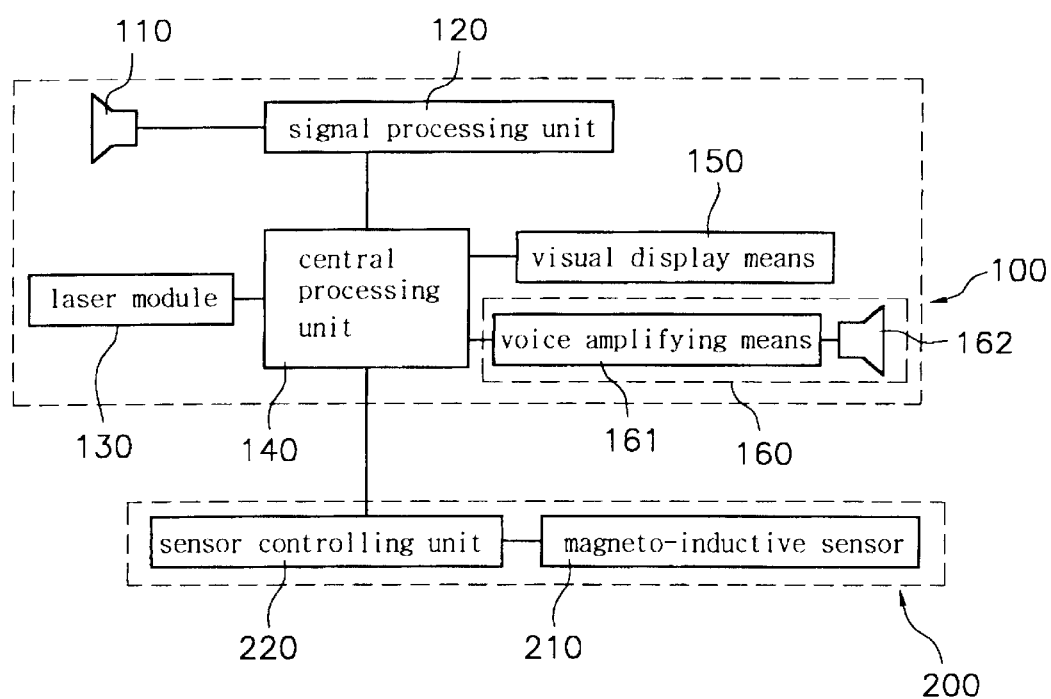
FIG. 2 is a block diagram showing an embodiment of a wide-band radar detector with an electronic compass integrated therein according to the present invention.

FIG. 2 is a block diagram showing an embodiment of a wide-band radar detector with an electronic compass integrated therein according to the present invention. As shown, a radar detecting unit 100 comprises a horn antenna 110, a signal processing unit 120, a laser module 130, a central processing unit 140, a visual display unit 150, and a voice producing means 160

The signal processing unit 120 detects signals received by the horn antenna 110. The laser module 130 receives laser signals. The central processing unit 140 controls both the signal processing unit 120 and the laser module 130. The visual display unit 150 visually displays the detected signals. The voice producing means 160 outputs the detected signals to a speaker 162 through a voice amplifying unit 161.

In addition, the wide-band radar detector may include an electronic compass 200 comprising a magneto-inductive sensor 210 for sensing the earth's magnetic field, and a sensor controlling unit 220. The sensor controlling unit 220 controls the magneto-inductive sensor 210 by supplying a bias voltage and transmits values sensed by the magneto-inductive sensor 210 to the central processing unit 140.

Figure 3:
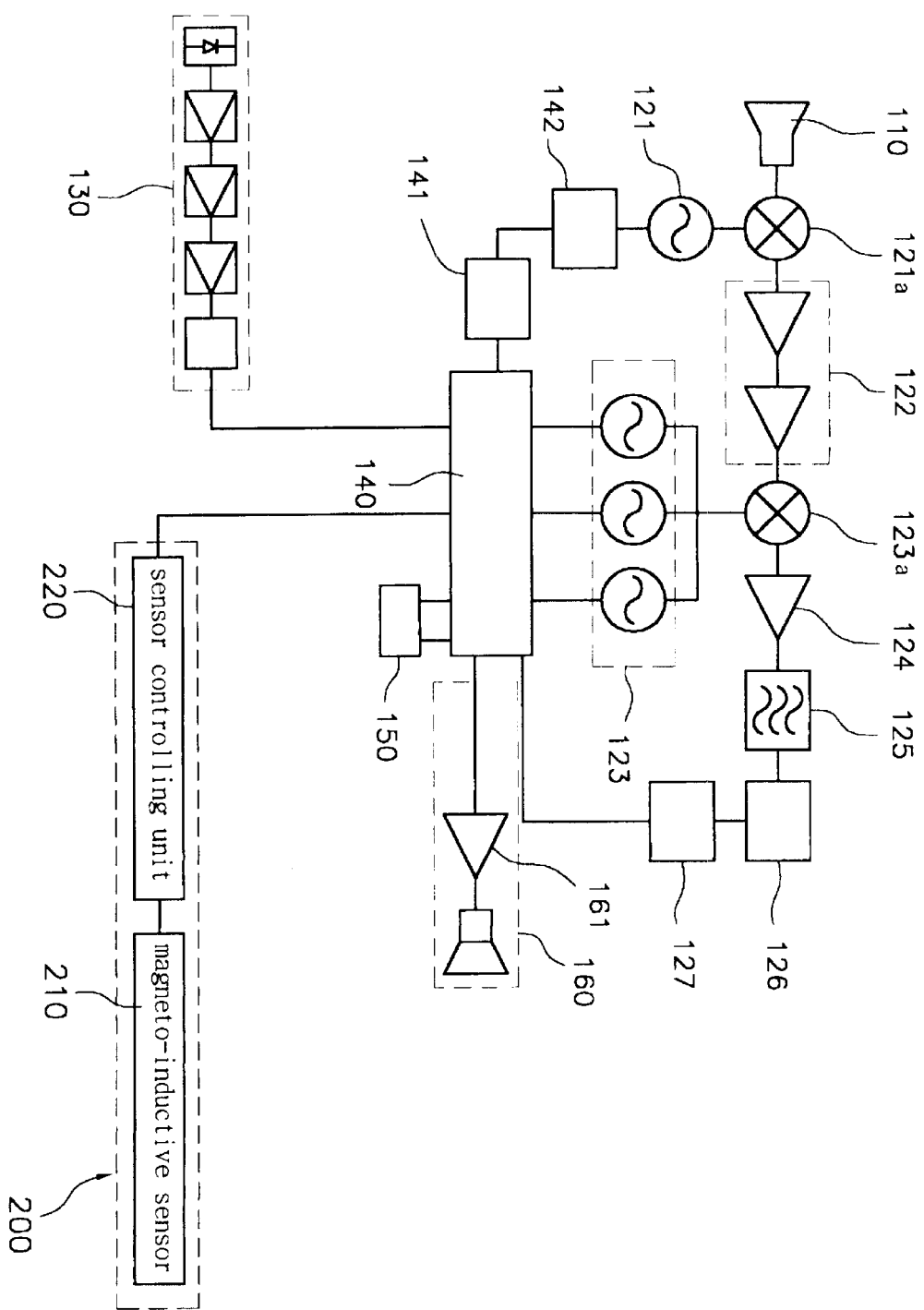
FIG. 3 is a detailed block diagram showing an embodiment of the wide-band radar detector with the electronic compass integrated therein according to the present invention.

FIG. 3 is a detailed block diagram showing an embodiment of the wide-band radar detector with the electronic compass integrated therein according to the present invention. As shown, the signal-processing unit 120 comprises a first local oscillating unit 121, a first amplifying unit 122, a second local oscillating unit 123, a second amplifying unit 124, a filtering unit 125, a demodulating unit 126, and an A/D converting unit 127.

The first local oscillating unit 121 generates oscillation frequencies of 11.800–12.300 GHz by using an oscillator cavity, which can oscillate at a wide-band of frequencies. The first amplifying unit 122 amplifies signals from a first mixing unit 121a and mixes the oscillation signals from the first local oscillating unit 121 with all the signals received by the horn antenna 110. The second local oscillating unit 123 generates oscillation frequencies of 300 MHz, 1380 MHz, and 2085 MHz and can oscillate continuously and alternately irrespective of whether the signals are received. The second amplifying unit 124 amplifies signals from a second mixing unit 123a and mixes the oscillation signals from the second local oscillating unit 123 with the amplified signals from the first amplifying unit 122. The filtering unit 125 selectively passes signals amplified by the second amplifying unit 124. The demodulating unit 126 detects signals that have passed through the filtering unit 125, and the A/D converting unit 127 converts the detected signals into digital signals.

The central processing unit 140 analyzes and outputs bands of information on the digital signals by measuring and calculating the periods and the widths of the digital signals. In addition, the central processing unit 140 controls the driving of the first and second local oscillating units 121, 123 by generating pulses in order to determine the types of information on the signals over time.

Furthermore, the wide-band radar detector may comprise a pulse delay unit 141 for delaying or holding the pulses received from the central processing unit 140, and a sweep voltage generating unit 142 for generating a voltage from the pulse delay unit 141 to drive the first local oscillating unit 121. The magneto-inductive sensor 210 uses a RL resonant circuit. The sensor controlling unit 220 applies a forward bias and a reverse bias to the magneto-inductive sensor 210 and measures times during which a fully charged state proceeds to a fully discharged state, respectively, to determine a compass direction by calculating a difference between the measured times based on application of the forward bias and the reverse bias. In addition, the sensor controlling unit 220 transmits values sensed by the magneto-inductive sensor 210 to the central processing unit 140 by using an SPI interface.

Figure 4:
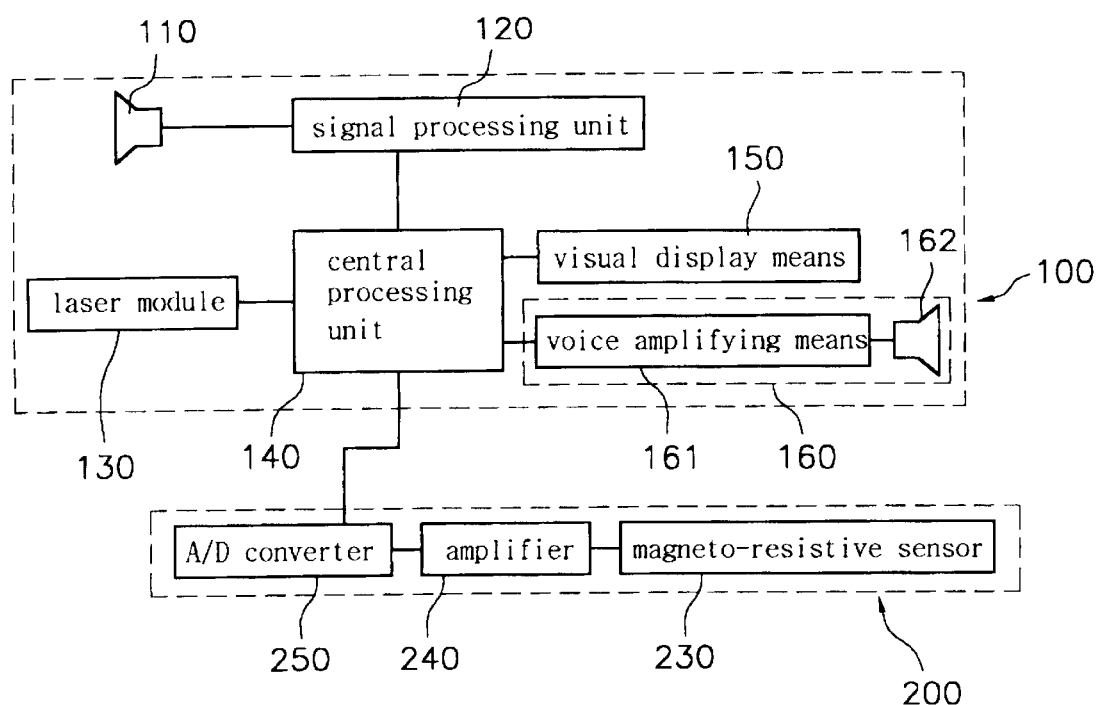
FIG. 4 is a block diagram showing another embodiment of the wide-band radar detector with the electronic compass integrated therein according to the present invention.

FIG. 4 is a block diagram showing another embodiment of the wide-band radar detector with the electronic compass integrated therein according to the present invention. As shown, a radar detecting unit 100 comprises a horn antenna 110, a signal processing unit 120, a laser module 130, a central processing unit 140, a visual display unit 150, and a voice producing means 160.

The signal processing unit 120 detects the signals received by the horn antenna 110. The laser module 130 receives the laser signals. The central processing unit 140 controls both the signal processing unit 120 and the laser module 130. The visual display unit 150 visually displays the detected signals. The voice producing means 160 outputs the detected signals to a speaker 162 through a voice amplifying unit 161.

In addition, an electronic compass 200 includes a magneto-resistive sensor 230, an amplifier 240, and an A/D converter 250. The magneto-resistive sensor 230 senses the earth's magnetic field. The magneto-resistive sensor 230 uses a Wheatstone bridge circuit, and transfers its output voltage to the amplifier 240. The amplifier 240 amplifies outputted signals from the magneto-resistive sensor 230. The A/D converter 250 converts the voltage amplified by the amplifier 240 into digital signals and transmits them to the central processing unit 140.

Figure 5A:
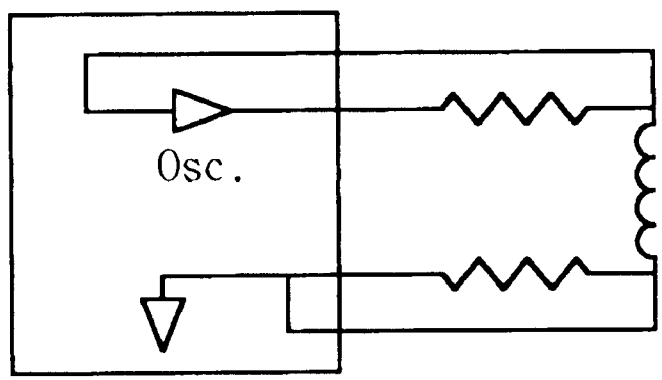
FIGS. 5a and 5b are circuit diagrams showing the operation of a magneto-inductive sensor in the wide-band radar detector with the electronic compass integrated therein according to the present invention.
Figure 5B:
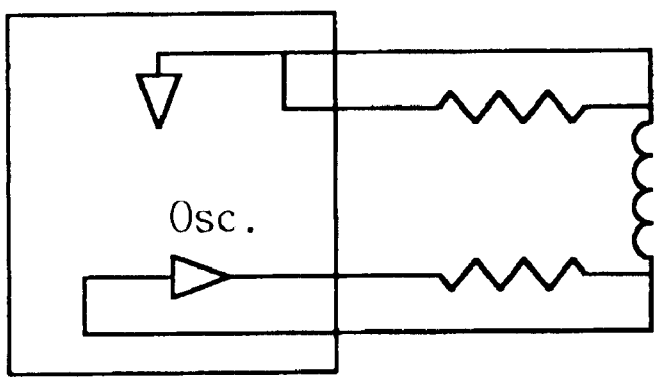
Figure 6:
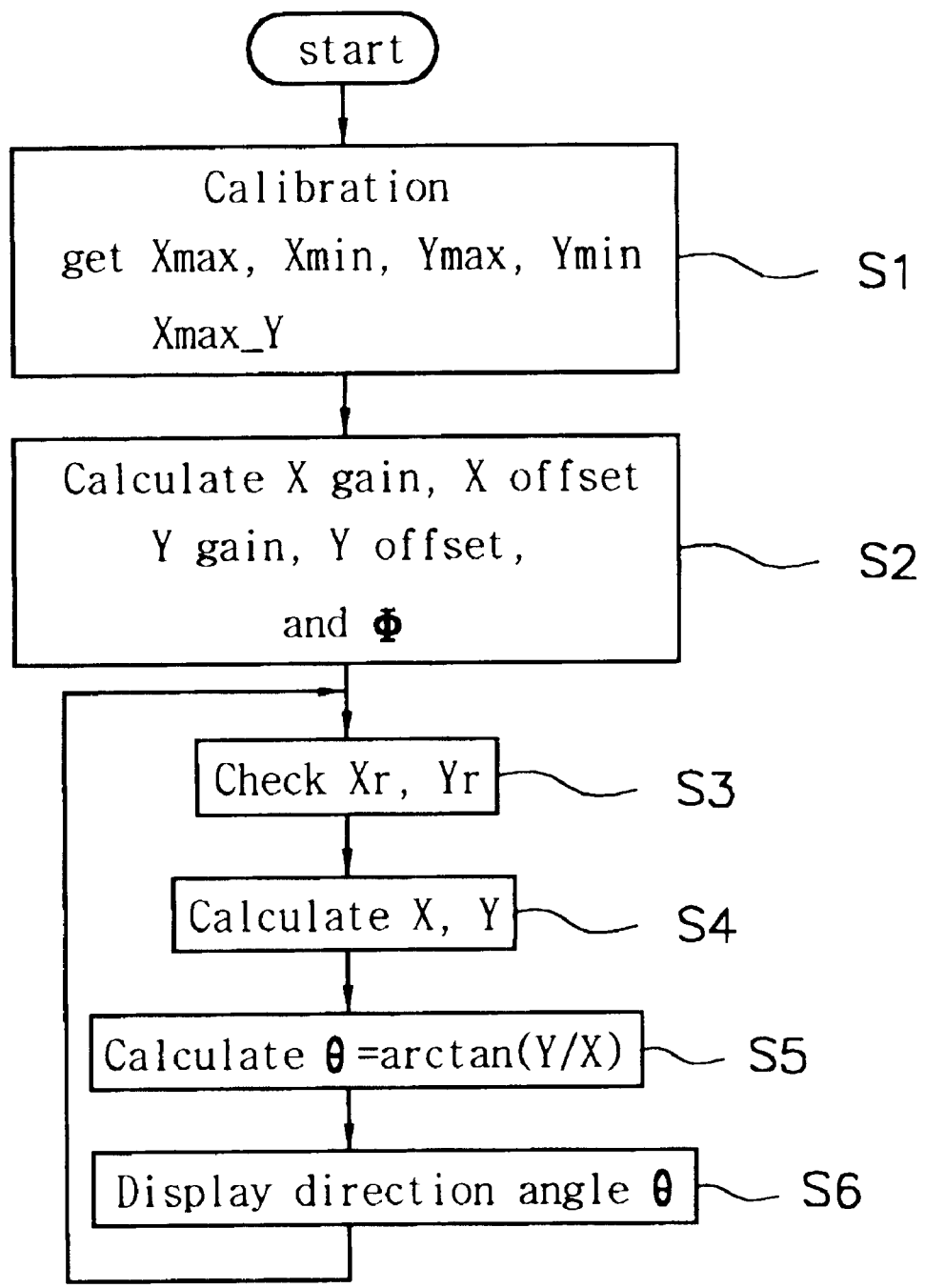
FIG. 6 is a flowchart showing the operation of a magneto-resistive sensor in the wide-band radar detector with the electronic compass integrated therein according to the present invention.

FIGS. 5a and 5b are circuit diagrams showing the operation of the magneto-inductive sensor in the wide-band radar detector with the electronic compass integrated therein according to the present invention. FIG. 6 is a flowchart illustrating the operation of the magneto-resistive sensor in the wide-band radar detector with the electronic compass integrated therein according to the present invention. Hereinafter, the operation of the wide-band radar detector and integrated electronic compass will be described in detail with reference to FIGS. 2 to 6.

The radar detecting unit 100 detects the signals falling within 8 bands, i.e. Ko, X, VG2, Ku, K, SA, SWS, and SUPERWIDE Ka bands. For laser signals, the radar detecting unit 100 determines whether the detected signals are true or not, and informs the driver of the determined results through the visual display means 150 and the voice producing means 160.

The sensor controlling unit 220 of the electronic compass 200 uses the magneto-inductive sensor 210 shown in FIG. 2. The electronic compass 200 switches and controls the magneto-inductive sensor 210 independently to measure and determine a direction.

Referring now to FIG. 5a, if the sensor controlling unit 220 applies a forward bias to the magneto-inductive sensor 210, one end of the magneto-inductive sensor 210 is grounded, while the other end of the magneto-inductive sensor 210 is charged and then discharged. The time during which the other end of the magneto-inductive sensor 20 is charged and then discharged is measured.

Subsequently, if the sensor controlling unit 220 applies a reverse bias, as shown in FIG. 5b, the other end of the magneto-inductive sensor 210, which was previously charged and then discharged, is now grounded, while the one end of the magneto-inductive sensor 210, which was previously grounded, is now charged and then discharged.

The sensor controlling unit 220 calculates the difference between the times measured during application of the forward bias and the reverse bias, and transmits them to the central processing unit 140 by using an SPI port. The central processing unit 140 controls the sensor controlling unit 220 to determine the difference (check time ratio) between the times during which the magneto-inductive sensor is charged and then discharged. The sensor controlling unit 220 then measures the check time ratio and transmits its value to the central processing unit 140 to determine the compass direction through a bit calculation for the transmitted value.

Hereinafter, the operation of the electronic compass 200 using the magneto-resistive sensor 230 shown in FIG. 4 will be now be described. The value detected by the magneto-resistive sensor 230 is amplified by the amplifier 240, and then converted by the A/D converter 250 into 16-bit data (Xr, Yr). The value is then used to determine the compass direction.

When the electronic compass is installed in the vehicle, calibration of the electronic compass may be performed. In the calibration process, while the vehicle makes a turn, parameter values (Xmax, Xmin, Ymax, Ymin, Xmax_Y) are obtained to calculate values of X- and Y-axes and determine a direction angle θ. The parameter values are stored into a read-only memory (ROM) and used to obtain an actual direction angle (θ=arc tan (Y/X)). The following equations are used:

$$X=(Xr-B)/A, Y=(Yr-D-C^*X^* \sin \Phi)/(C^* \cos \Phi) \quad (1)$$

where Φ=arc sin[(Xmax_Y−D)/C],
A=(Xmax−Xmin)/2: gain of X,
B=(Xmax+Xmin)/2: offset of X,
C=(Ymax−Ymin)/2: gain of Y, and
D=(Ymax+Ymin)/2: offset of Y.

The respective parameter values are obtained in the calibration process (step S1). The gain and offset of the X, the gain and offset of the Y, and (d) are then calculated by using the above equations (step S2). The values of the Xr and Yr are received from the magneto-resistive sensor 230 (step S3). The values of the X and Y are then calculated by using the above equation (1) (step S4). The direction angle θ is calculated by using the values of the X and Y (step S5). The direction angle θ is then displayed (step S6).

When the values of the Xr and Yr through the magneto-resistive sensor 230 are obtained, the values of the X and Y are calculated by using the values obtained from the above calibration process to determine the direction angle θ.

Figure 7A:
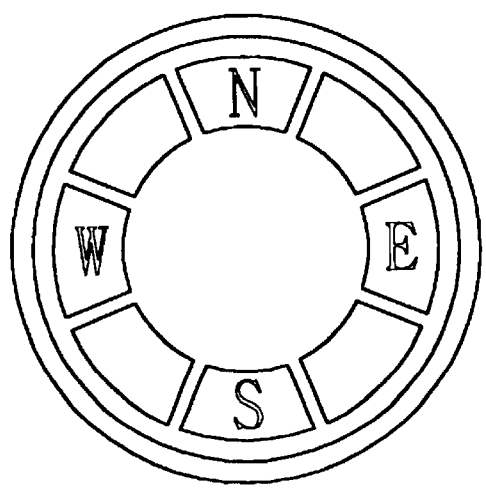
FIGS. 7a and 7b are schematic views illustrating a display unit of the electronic compass in the wide-band radar detector with the electronic compass integrated therein according to the present invention.
Figure 7B:
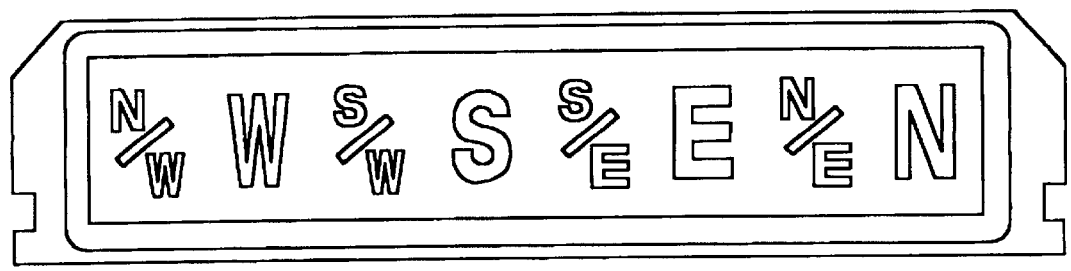

The direction angle θ may be displayed in various ways. For example, as shown in FIGS. 7a and 7b, the compass direction corresponding to the direction angle θ may be displayed in a circular form or in a parallel-arranged form.

According to the present invention, there are advantages in that the wide-band radar detector with the electronic compass integrated therein can be easily installed in the vehicle without having to separately install wiring or multiple power distributors. In addition, a driver may avoid a traffic accident, and drive more safely. The driver's convenience may be improved by allowing the driver to correctly judge a traffic situation while simultaneously determining a moving direction of the vehicle.

Although the present invention has been described with respect to the above embodiments, these are not intended to limit the present invention but provided for illustrative purposes only. Therefore, it will be understood by those skilled in the art that various other modifications and equivalents can be made thereto without departing from the scope and spirit of the present invention. The scope of the invention is defined by the appended claims.

What is claimed is:

1. A wide-band radar detector with an electronic compass integrated therein, comprising:
   a radar detecting unit including
      a first local oscillating unit integrally installed on a side of a horn antenna,
      a first amplifying unit for amplifying signals from a first mixing unit for mixing oscillation signals having a first local frequency generated from the first local oscillating unit with all the signals received by the horn antenna,
      a second local oscillating unit that generates oscillation signals,
      a second amplifying unit for amplifying signals from a second mixing unit for mixing the oscillation signals generated by the second local oscillating unit with the amplified signals from the first amplifying unit,
      a filtering unit for selectively passing the signals amplified by the second amplifying unit,
      a demodulating unit for detecting signals that have passed through the filtering unit,
      an A/D converting unit for converting the detected signals into digital signals,
      a central processing unit which analyzes and outputs bands of information on the digital signals by measuring and calculating the periods and the widths of the digital signals, and controls the driving of the first and second local oscillating units by generating pulses in order to determine the types of information on the signals over time,
      a pulse delay unit for delaying or holding the pulses received from the central processing unit,
      a sweep voltage generating unit for generating a voltage from the pulse delay unit to drive the first local oscillating unit,
      a laser module integrally formed with the horn antenna for receiving laser signals,
      a voice producing means for outputting the detected signals to a speaker through a voice amplifying unit, and
      a visual display means for visually displaying the detected signals; and
   an electronic compass including
      a magneto-inductive sensor for sensing earth's magnetic field, and
      a sensor controlling unit for controlling the magneto-inductive sensor by applying a bias voltage to the magneto-inductive sensor and for transmitting the values sensed by the magneto-inductive sensor to the central processing unit.

2. The wide-band radar detector as claimed in claim 1, wherein the sensor controlling unit applies a forward bias and a reverse bias to the magneto-inductive sensor and measures times during which a fully charged state proceeds to a fully discharged state, respectively, and determines a compass direction by calculating a difference between the measured times during application of the forward bias and the reverse bias.

3. The wide-band radar detector as claimed in claim 1, wherein the second oscillating unit is comprised of three oscillators that oscillate at separate frequencies respectively.

4. The wide-band radar detector as claimed in claim 1, wherein the sensor controlling unit transmits the values sensed by the magneto-inductive sensor to the central processing unit by using an SPI interface.

5. A wide-band radar detector with an electronic compass integrated therein, comprising:
- a radar detecting unit including
  - a first local oscillating unit integrally installed on a side of a horn antenna,
  - a first amplifying unit for amplifying signals from a first mixing unit for mixing oscillation signals having a first local frequency generated from the first local oscillating unit with all the signals received by the horn antenna,
  - a second local oscillating unit that generates oscillation signals,
  - a second amplifying unit for amplifying signals from a second mixing unit for mixing the oscillation signals generated by the second local oscillating unit with the amplified signals from the first amplifying unit,
  - a filtering unit for selectively passing the signals amplified by the second amplifying unit,
  - a demodulating unit for detecting signals that have passed through the filtering unit,
  - an A/D converting unit for converting the detected signals into digital signals,
  - a central processing unit which analyzes and outputs bands of information on the digital signals by measuring and calculating the periods and the widths of the digital signals, and controls the driving of the first and second local oscillating units by generating pulses in order to determine the types of information on the signals over time,
  - a pulse delay unit for delaying or holding the pulses received from the central processing unit,
  - a sweep voltage generating unit for generating a voltage from the pulse delay unit to drive the first local oscillating unit,
  - a laser module integrally formed with the horn antenna for receiving laser signals,
  - a visual display means for visually displaying the detected signals, and
  - a voice producing means for outputting the detected signals to a speaker through a voice amplifying unit; and
- an electronic compass including
  - a magneto-resistive sensor for sensing earth's magnetic field,
  - an amplifier for amplifying signals outputted from the magneto-resistive sensor, and
  - an A/D converter for converting the signals amplified by the amplifier into digital signals and for transmitting them to the central processing unit.

6. A wide-band radar detector with an electronic compass integrated therein, comprising:
- a radar detecting unit including
  - a first local oscillating unit integrally installed on a side of a horn antenna,
  - a first amplifying unit for amplifying signals from a first mixing unit for mixing oscillation signals having a first local frequency generated from the first local oscillating unit with all the signals received by the horn antenna,
  - a second local oscillating unit comprised of three oscillators which oscillate at separate frequencies, respectively,
  - a second amplifying unit for amplifying signals from a second mixing unit for mixing the oscillation signals generated by the second local oscillating unit with the amplified signals from the first amplifying unit,
  - a filtering unit for selectively passing the signals amplified by the second amplifying unit,
  - a demodulating unit for detecting signals that have passed through the filtering unit,
  - an A/D converting unit for converting the detected signals into digital signals,
  - a central processing unit which analyzes and outputs bands of information on the digital signals by measuring and calculating the periods and the widths of the digital signals, and controls the driving of the first and second local oscillating units by generating pulses in order to determine the types of information on the signals over time,
  - a pulse delay unit for delaying or holding the pulses received from the central processing unit,
  - a sweep voltage generating unit for generating a voltage from the pulse delay unit to drive the first local oscillating unit,
  - a laser module integrally formed with the horn antenna for receiving laser signals,
  - a voice producing means for outputting the detected signals to a speaker through a voice amplifying unit, and
  - a visual display means for visually displaying the detected signals; and
- an electronic compass including
  - a magneto-inductive sensor for sensing earth's magnetic field, and
  - a sensor controlling unit for controlling the magneto-inductive sensor by applying a bias voltage to the magneto-inductive sensor and for transmitting the values sensed by the magneto-inductive sensor to the central processing unit.

7. A wide-band radar detector with an electronic compass integrated therein, comprising:
- a radar detecting unit including
  - a horn antenna,
  - a signal processing unit for detecting signals received by the horn antenna,
  - a laser module for receiving laser signals,
  - a central processing unit for controlling the detection of the signals by both the signal processing unit and the laser module,
  - a visual display means for visually displaying the detected signals, and
  - a voice producing means for outputting the detected signals to a speaker through a voice amplifying unit; and
- an electronic compass including
  - a magneto-inductive sensor for sensing earth's magnetic field, and
  - a sensor controlling unit for controlling the magneto-inductive sensor by applying a bias voltage to the magneto-inductive sensor and for transmitting the values sensed by the magneto-inductive sensor to the central processing unit, wherein the sensor controlling unit applies a forward bias and a reverse bias to the magneto-inductive sensor and measures times during which a fully charged state proceeds to a fully discharged state, respectively, and determines a compass direction by calculating a difference between the measured times during application of the forward bias and the reverse bias.

* * * * *